United States Patent
Toomey

[15] 3,705,743
[45] Dec. 12, 1972

[54] COMBINATION KITCHEN AND CLOTHES TRAILER

[72] Inventor: Thomas J. Toomey, 604 Paradise Court, Gaithersburg, Md. 20760

[22] Filed: June 9, 1971

[21] Appl. No.: 151,343

[52] U.S. Cl. ............... 296/23 R, 211/94, 296/24 R
[51] Int. Cl. ............................................. B60g 3/32
[58] Field of Search ....... 296/1 R, 23 R, 24 R, 37, 22, 296/23 A–23 H; 211/94

[56] References Cited

UNITED STATES PATENTS

| 1,422,498 | 7/1922 | Vint | 296/23 H |
| 1,132,190 | 3/1915 | Kohout | 211/94 |

Primary Examiner—Philip Goodman
Attorney—Watson, Cole, Grindle & Watson

[57] ABSTRACT

A mobile trailer frame comprises a walled and roof housing which includes a hinged side opening which is supported by telescoping members to provide access to a mobile kitchen which includes a refrigerator, stove, and adjustable shelved compartments for the storage of food. The front and rear of the mobile trailer has a doorway which provides access to a clothing storage area which extends the full length of the trailer and which includes a fully extendible clothes rack which rides on nylon wheels in a track so as to extend from the closet outside of the mobile trailer to provide easy access to the clothes.

4 Claims, 5 Drawing Figures

INVENTOR,
THOMAS J. TOOMEY
BY Watson, Cole, Grindle & Watson
ATTORNEYS

INVENTOR,
THOMAS J. TOOMEY
BY Watson, Cole, Grindle & Watson
ATTORNEYS

COMBINATION KITCHEN AND CLOTHES TRAILER

This invention relates to mobile trailers and, in particular, to such a trailer which provides storage for clothes as well as the necessities of a kitchen, which includes a refrigerator, stove and storage area for food.

There has become an increasing need in our modern society for mobile trailers which afford kitchen facilities which may be used while travelling or camping. Additionally, it is desirable to provide adequate storage space for clothing and the like. In recent years, many different types of mobile kitchen trailers have been manufactured and sold to the public for towing behind automobiles. However, such trailers have not provided mobile kitchen facilities along with sufficient clothing storage whereby clothes may be hung to avoid creasing and wrinkling and to which easy access may be had.

This invention provides a combined mobile kitchen and clothes storage trailer which may be attached to and drawn behind an automobile. A hinged door is provided at both sides of the trailer and supported by telescoping members so that access may be gained to a kitchen area which includes refrigerator, stove and compartments for the storage of food, slide-out drawers for storing forks, spoons, knives, and the like. The front and rear of the trailer has a door which provides access to a storage area extending the entire length and remaining width of the trailer. Either side may also be used for storage of clothing and bedding. A fully extendible clothes rod is guided on wheeled members which engage a track so that clothes stored thereon may be easily withdrawn from the interior of the trailer to the exterior of the trailer whereby easy access may be had to the clothes for removal and placing on the storage rod.

It is a primary object of this invention to provide an improved combination mobile kitchen and clothes storage trailer.

A further object of the invention is the provision of such a combined mobile trailer which includes improved means for storage of clothing to afford easy access to the storage area.

Other objects and advantageous features of the invention will be apparent from the following description and the accompanying drawings wherein a specific embodiment of the invention is set forth in detail:

Figure 1:
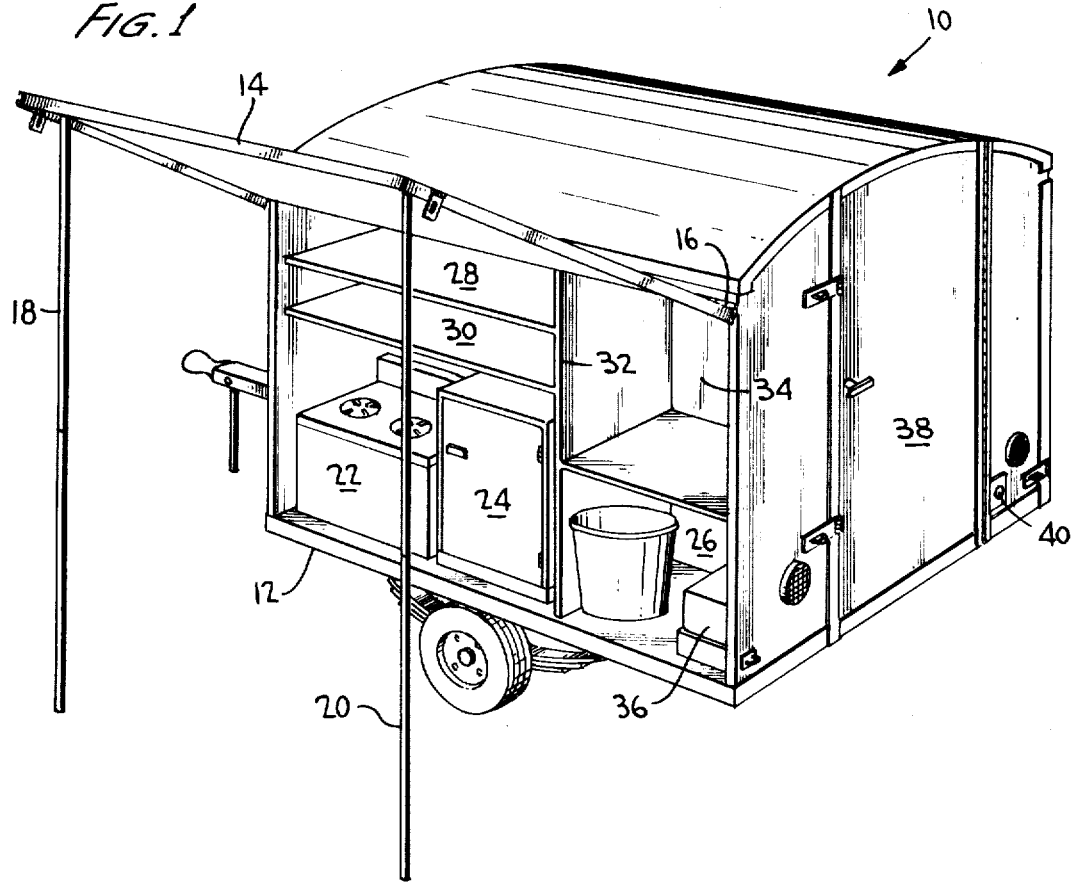
FIG. 1 illustrates a perspective view of the combined trailer illustrating the side hinged door which is supported by telescoping members to provide access to a kitchen area.

With reference to the drawings, wherein like numerals designate like parts throughout the several views, the combined kitchen-clothes trailer is generally designated by numeral 10 and comprises a trailer frame 12 upon which is supported a housing having front, rear, and side walls and a roof. Side wall 14 is hinged at 16 to housing 10 and includes telescoping members 18 and 20 which support the door to provide access to a kitchen area. The kitchen area includes a stove 22, refrigerator 24, a disposal area 26 and a number of adjustable shelves 28, 30 which provide storage for food items and the like. Partition 32 divides the kitchen area to provide a large compartment area 34 which may be utilized to hold large containers, slide-out drawers for forks, spoons, knives, etc. The mobile combined kitchen-clothes trailer is wired for electricity and generator 36 provides the necessary electrical current which may operate a refrigerator, if desired. Additionally, a side door 14 may be provided with a light (not shown) on its inside surface so as to provide light when the side door is opened and supported by the telescoping members. The rear of the housing is provided with a hinged door 38 which extends the full height of the trailer. The dimensions of the trailer may be varied in accordance with the size of the desired kitchen area and clothes storage area that is desired; however, in a preferred embodiment, the trailer is approximately 83 inches long, by 48 inches wide, by 61 inches in height. An electrical outlet 40 may be mounted at the rear of housing 10 to provide an access to electrical current provided by generator 36, or to any available electrical hookup, which may be external to the mobile trailer.

Figure 2:
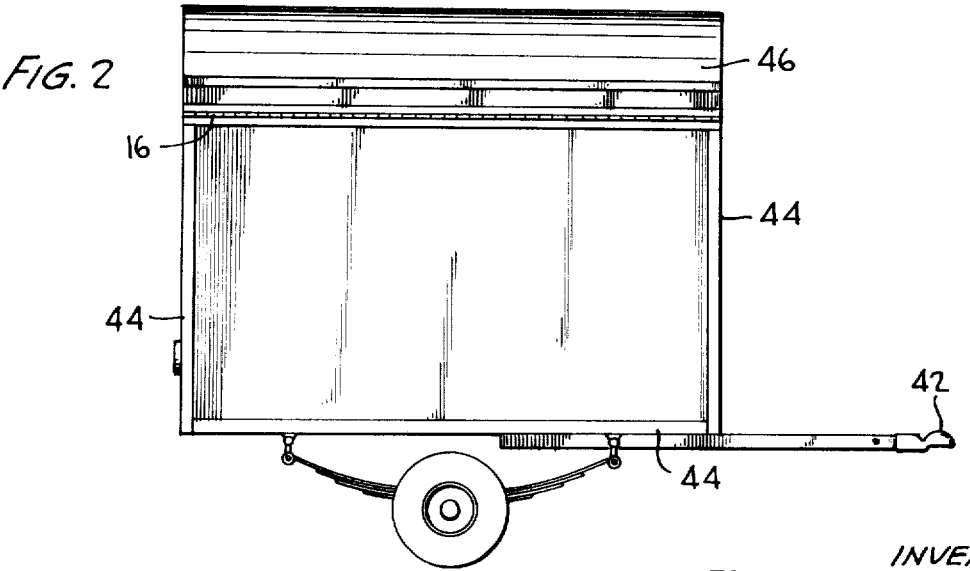
FIG. 2 illustrates a side view of the mobile trailer.

The trailer is preferably constructed of aluminum which is a light but sturdy and durable material which requires a minimum amount of maintenance. As illustrated in FIG. 2, the trailer is provided with a trailer hitch 42 which may be attached to the rear of an automobile so that the trailer may be towed behind. The strength of the trailer is increased by the use of angles 44 along each corner of the trailer as well as the bottom of the trailer. The roof 46, has a somewhat rounded shape as illustrated, so that water and precipitation will run off and not collect on its surface.

Figure 3:
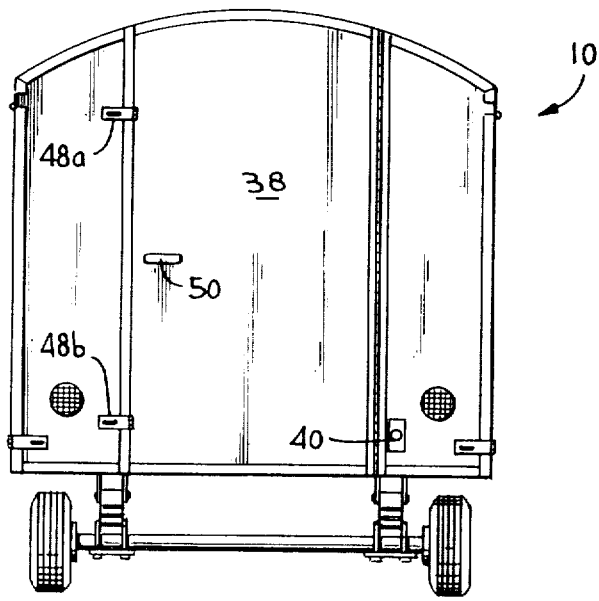
FIG. 3 illustrates a rear view of the combined trailer showing the door which provides access to the clothes storage area.

FIG. 3 illustrates the rear of housing 10 and shows door 38 which is hinged by hinges 48a, 48b. Handle 50 may be provided at the side of the door so that it may be easily opened and closed.

Figure 4A:
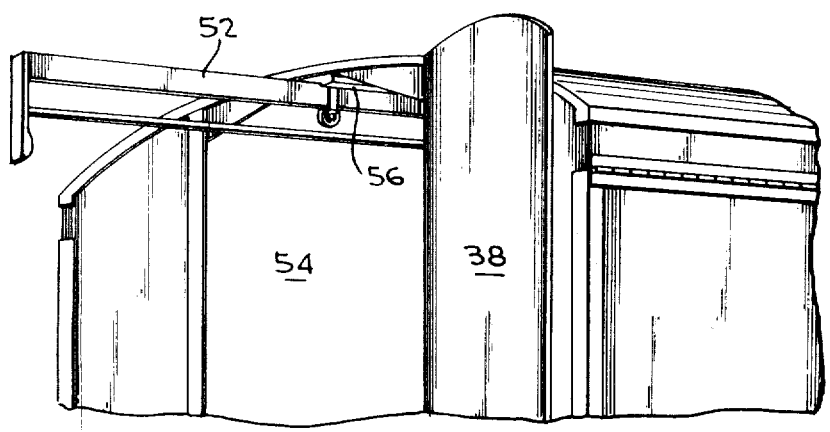
FIG. 4a illustrates the sliding clothes rack which is extensible from the front or rear of the trailer.
Figure 4B:
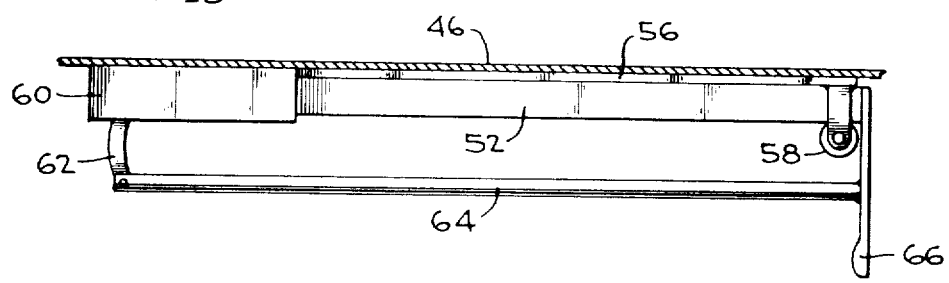
FIG. 4b illustrates a detailed drawing of the extensible clothes rack mechanism.

FIG. 4a illustrates the manner in which sliding clothes rack 52 is extended from the interior of the clothing storage area 54, access to which is provided through door 38. As illustrated, sliding clothes rack 52 may be extended to the outside of the trailer to provide easy access to the clothes hung therefrom. FIG. 4b illustrates a detailed representation of the sliding clothes rack. Track 56 is mounted to the undersurface of the roof of the trailer and clothes rack 52 is suspended from track 56 by means of nylon rollers, one of which is illustrated at 58. Sleeve 60 serves to provide a lateral guide for the clothes rod. Back hanger stop 62 supports one end of clothes rod 64 and pullout handle 66 is provided at the outer end so that the sliding clothes rack may be pulled from or pushed into the trailer.

What is claimed is:

1. A trailer having a wheeled base frame, comprising;
   a fully enclosed housing having side walls, front and rear walls and a roof,
   said side walls are hinged to said housing and include telescoping support members for retaining said side walls in a substantially horizontal position,
   a partition extending lengthwise along said housing from said front to said rear wall and parallel to said side walls to divide said housing into first and second sections, said first section is immediately adjacent said hinged side wall and includes partitions dividing said first section into storage and utility compartments, said front and rear walls each include a hinged door providing access to said second section, said second section including a clothes hanger mounted therein and extending through the open door.

2. A trailer as in claim 1 wherein said housing further includes electrical generator means and an electrical outlet exposed to the outside of said housing for providing access to the electrical output of said generator.

3. A trailer as in claim 1 wherein said clothes hanger includes a track mounted to the trailer roof and rollers at each end of said hanger engaging said track.

4. A trailer as in claim 3 wherein said clothes hanger further includes a clothes rod suspended from said track and support members for suspending said rod, and both of said support members include a handle for extending said clothes hanger.

* * * * *